United States Patent [19]

Piard

[11] Patent Number: 4,974,289

[45] Date of Patent: Dec. 4, 1990

[54] HINGE WITH ELASTIC HOUSING

[76] Inventor: Gerard Piard, Champied, Pratz, 39170 Saint Lupicin, France

[21] Appl. No.: 377,155

[22] Filed: Jul. 10, 1989

[30] Foreign Application Priority Data

Jul. 11, 1988 [FR] France .................. 88 09843

[51] Int. Cl.⁵ .................. G02C 5/00; E05D 11/00
[52] U.S. Cl. .................. 16/228; 16/334; 16/336; 16/296
[58] Field of Search .................. 16/228, 296, 334, 335, 16/336, 293

[56] References Cited

U.S. PATENT DOCUMENTS

| | | | |
|---|---|---|---|
| 3,110,057 | 11/1963 | Urich .................. | 16/228 |
| 3,465,381 | 9/1969 | Lawrie et al. .................. | 16/296 |
| 4,506,408 | 3/1985 | Brown .................. | 16/225 |
| 4,561,735 | 12/1985 | Levoy .................. | 351/153 |

FOREIGN PATENT DOCUMENTS

| | | | |
|---|---|---|---|
| 354129 | 6/1922 | Fed. Rep. of Germany ...... | 16/335 |
| 2261704 | 6/1974 | Fed. Rep. of Germany . | |
| 3404511 | 8/1985 | Fed. Rep. of Germany . | |
| 1544938 | 11/1968 | France .................. | 16/293 |
| 2379681 | 9/1978 | France . | |

Primary Examiner—Richard K. Seidel
Assistant Examiner—Carmine Cuda
Attorney, Agent, or Firm—Oliff & Berridge

[57] ABSTRACT

A hinge is made of two elements articulated to one another. One element constitutes at least one fork, supporting the hinge pin, and the other element constitutes at least one hub fitted on the hinge pin supported by the fork. Each bearing of the fork and each hub is connected by a tenon to a leaf of the hinge. The hubs and bearings of the two elements are accommodated in a housing of elastic material such as a metal or other appropriate material, such as a plastic or the like. The housing is rotationally connected with the bearings of each fork, with a longitudinal slot being provided in the housing, arranged parallel to the hinge pin. The slot is designed to allow tenons of both elements of the hinge to pass. The width of the slot is determined, at least by correspondence of the tenon of each hub, as a function of the maximum desired opening angle.

14 Claims, 3 Drawing Sheets

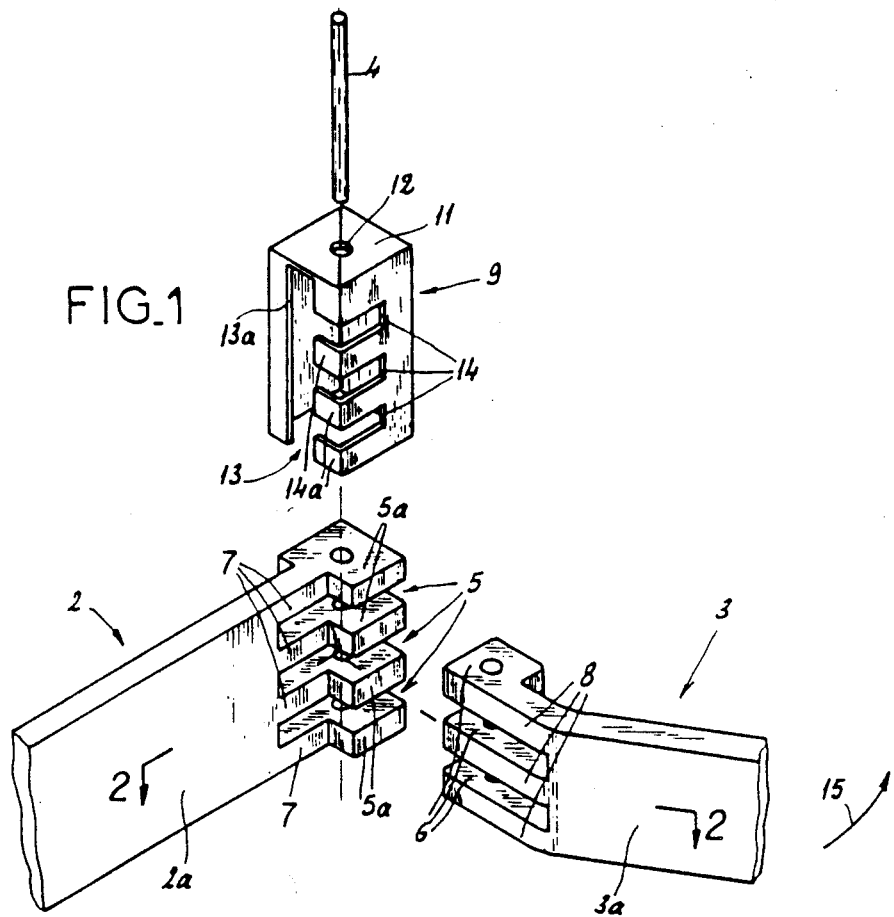
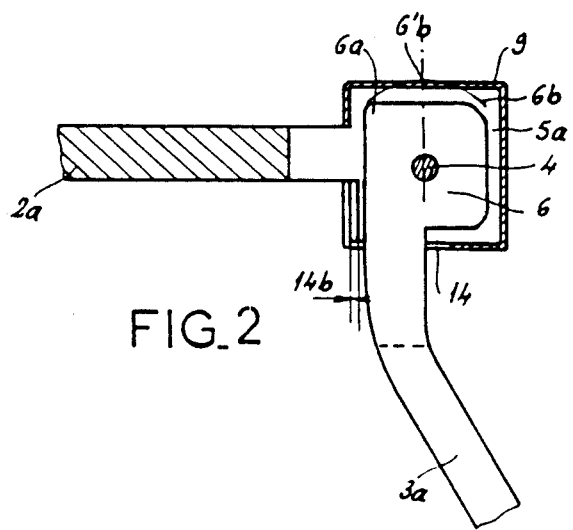

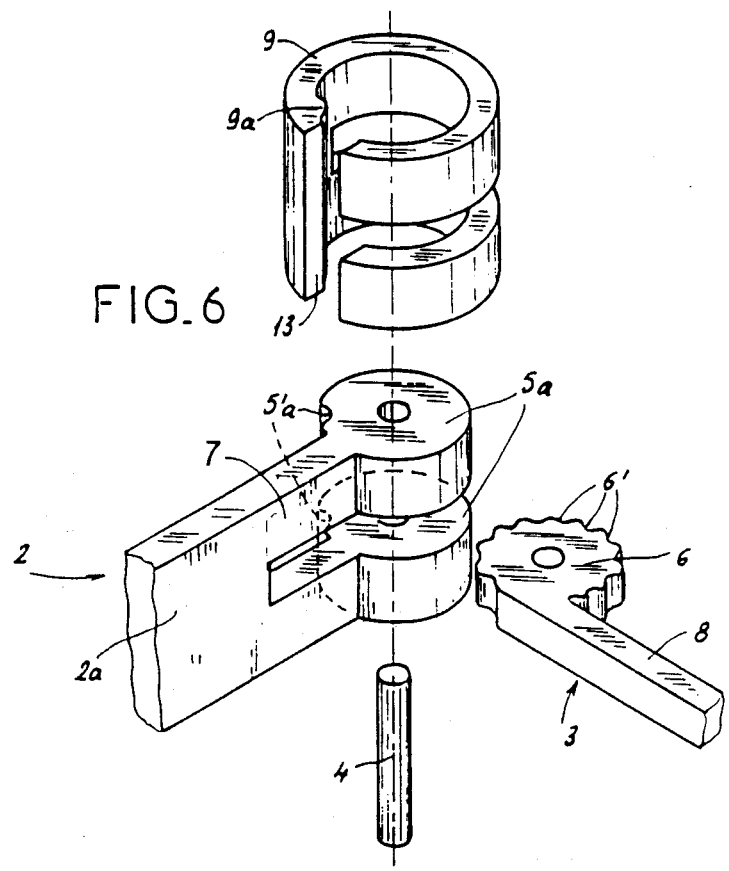
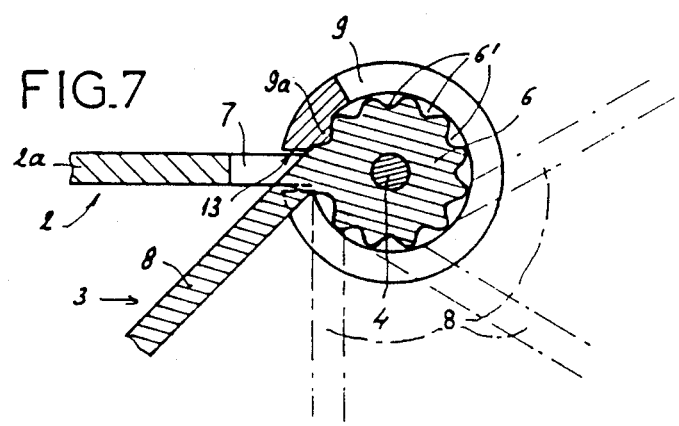

HINGE WITH ELASTIC HOUSING

TECHNICAL FIELD

The present invention relates to a hinge and especially, although not exclusively, a hinge for eyeglass temples.

BACKGROUND

A hinge generally comprises two elements articulated to one another, one of which comprises at least one fork supporting the hinge pin and the other comprises at least one hub mounted on the pin supported by the fork, each bearing of the fork and each hub being connected by a tenon to a leaf of the hinge.

In this type of hinge, provision is rarely made to provide, at the maximum opening angle, elasticity other than that inherent in the component material of the element connected with one of the elements of the hinge, such as the temple when an eyeglass temple is involved.

In addition, provision is rarely made, not only in hinges designed for hinging the temples of eyeglasses, but also in those intended for other articulations like those of automobile doors or the doors of furniture, more especially kitchen furniture, of means tending to hold elastically the two elements of the hinge in a closed position, in other words, in the position corresponding to the minimum angle. These means are generally composed of a plunger in the form of a ball accommodated in a recess in one of the elements of the hinge and continuously urged by a spring against a cam-shaped section provided in the other element of this hinge.

It will be readily understood that means of this kind have a high cost by virtue of their design and the operations required to install them, and their cost also increases inversely with the size of their component parts, which is clearly the case when hinges for eyeglasses temples are involved.

SUMMARY OF THE INVENTION

A goal of the present invention is to overcome all of these disadvantages. To this end, the hubs and bearings of the two elements of the inventive hinge are housed in a housing made of an appropriate material, such as a plastic or the like, linked in rotation with the bearings of each fork. In the wall of the housing is provided a longitudinal slot, disposed parallel to the axis of the hinge, and designed to permit the tenons of the two elements of the hinge to pass and whose width is determined, at least as regards the tenon of each hub, as a function of the maximum desired opening angle. This housing thus elastically limits the opening of the elements of this hinge to the desired maximum angle.

BRIEF DESCRIPTION OF THE DRAWINGS

The invention will be clearly understood from the following description with reference to the attached schematic diagrams which show nonlimitative embodiments of the invention:

FIG. 1 is an exploded perspective view;

FIG. 2 is a cross section along line 2—2 in FIG. 1 of this hinge in the assembled state, in the maximum opening position;

FIG. 6 is an exploded perspective view showing a second embodiment of this hinge;

FIG. 7 is a cross section of the hinge in FIG. 6, showing its method of operation.

DETAILED DESCRIPTION OF PREFERRED EMBODIMENTS

Figure 3:
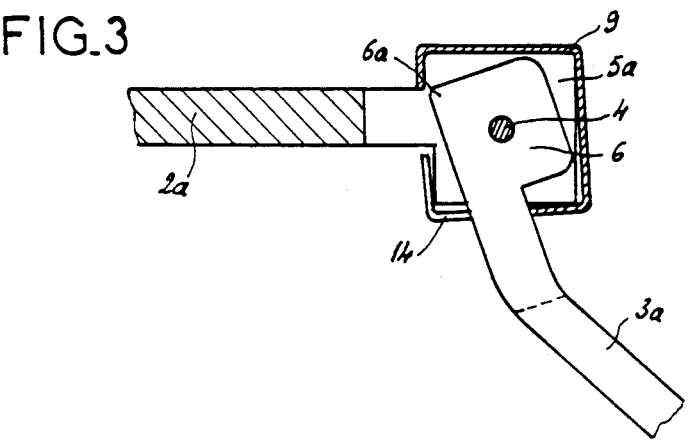
FIG. 3 is a cross section similar to FIG. 2, showing the hinge in the position exceeding its maximum normal opening angle.

If it is desired to confer on this hinge elastic retention in one of several specific angular positions, according to one embodiment of this hinge, on either side of the corresponding tenon, the contour of the bearings is circular and, on either side of its longitudinal slot, the internal cross section of the housing is circular and of the same radius as the bearings so as to match them perfectly. The housing, preferably in the vicinity of one of the edges of its slot, has a longitudinal boss and each bearing has, in the same angular position as the housing boss, a notch capable of receiving the corresponding section of the boss. Each hub has a circular external perimeter of the same radius as the bearings but having a plurality of notches capable of being engaged successively depending on the user's wishes on the corresponding end of the housing boss.

According to one embodiment of this hinge, the external contour of the bearings is polygonal and the housing has a bore whose cross section is essentially the same as this external contour, while the external contour of each hub has at least one boss whose circular trajectory is not completely inscribed within the bore of the housing and each of which is angularly positioned so that the point on its trajectory which projects farthest outside the housing is located between two adjacent stable angular positions.

Thus, the pivoting of this hub in the direction corresponding to the opening of the hinge elements unavoidably causes a momentary elastic deformation of the housing which tends to bring it normally into the closed position at the minimum angle of the hinge, at least as long as a hub pivoting threshold is not exceeded.

Preferably, the boss of each hub has its dimensions and angular position determined so that in the closed position of the hinge, the latter is in contact, at least under light pressure, with one of the faces of the housing.

According to a useful embodiment of the invention, the slot in the housing has, along at least one of its edges and coinciding with each tenon of the hub, a notch orthogonal to the axis of the hinge, whose bottom serves as a stop to limit the opening of said tenon.

This arrangement makes it possible to avoid inadvertent expulsion of the housing as a result of opening the hinge to an extreme angle because the teeth which remain within the notches of the housing permit it to encircle the fork sufficiently to eliminate this risk.

The simplicity of the design and consequently of the assembly of this hinge makes it possible to manufacture it at very low cost regardless of its dimensions.

With reference to the drawings, the hinge is of the type comprising two elements 2 and 3 articulated to one another by means of a hinge pin 4. Element 2, which is designed to constitute at least one fork, comprises in this example three forks 5, each of which comprises two bearings 5a designed to support hinge pin 4, two of said bearings being common to two adjacent forks. Element 3, designed to constitute at least one hub engageable with pin 4, in this example has three hubs 6 each of which is intended to engage pin 4 between the two bearings 5a of a fork 5. Each element 2 and 3 of this hinge likewise comprises a leaf, 2a and 3a respectively, designed to be attached to the element, such as an eyeglass frame and one of its temples.

Each bearing 5a of forks 5 of element 2 is connected to hinge leaf 2a by a tenon 7 and each hub 6 of element 3 is connected to the leaf of hinge 3a by a tenon 8.

As shown in the drawings, each bearing 5a of forks 5 of element 2 has an essentially rectangular external contour. After assembly, in other words after hubs 6 have been engaged between bearings 5 and installed on pin 4, the assembly is enclosed by a housing 9 whose bore, as the drawing shows, has a cross section essentially equal to the peripheral contour of bearings 5a of forks 5. This arrangement provides housing 9 and element 2 of the hinge with a rotary connection, eliminating any possibility of relative movement of one relative to the other around pin 4. In addition, housing 9 can be closed at one or both ends by a transverse wall 11 of which preferably at least one end has a central hole 2 permitting the insertion of pin 4 after elements 2 and 3 of the hinge have been assembled.

Housing 9 has a longitudinal slot 13 provided to allow passage of tenons 7 of element 2. One of the edges of this slot 13, namely 13a, is smooth and designed to be constantly abutting the outer faces of tenons 7 of element 2 of the hinge.

The edge opposite edge 13a of longitudinal slot 13 has peripheral notches 14, oriented at right angles to pin 4, whose number is equal to that of tenons 8 of element 3 and each of which is designed to allow one of these tenons 8 to pass through.

Housing 9 is made of an elastic material such as steel or any other appropriate material such as a plastic or the like. As a result of this elasticity, pivoting of element 3 of the hinge in the opening direction, in other words in the direction of arrow 15, beyond the angular position in which tenons 8 of this element come into contact with the bottoms of notches 14, is possible. This arrangement thus confers a certain elasticity on the maximum opening angle of elements 2 and 3 of the hinge, thereby reducing the risk of its breakage.

Notches 14, provided along one of the edges of slot 13, accommodate between them teeth 14a whose presence allows the housing to surround bearings 5a of forks 5 of element 2 sufficiently, even in the presence of a significant elastic deformation of housing 9, to prevent its ejection. However, as FIG. 2 shows, to allow housing 9 to deform elastically, it is necessary to provide, between teeth 14a and the corresponding part of the outline of each bearing 5a, a play 14b that the elastic deformation of the housing, after exceeding the maximum opening angle shown in FIG. 2, tends to decrease and even to eliminate, as shown in FIG. 3.

As the drawing shows, and especially FIGS. 2 to 5, the peripheral contour of each hub 6 of element 3 has a boss 6a whose circular trajectory 6b projects outside housing 9 when the latter is at rest, as shown in FIG. 2.

This boss 6a is positioned angularly on corresponding hub 6 so that point 6'b of its trajectory 6b furthest from the exterior of housing 9 is located between its extreme positions corresponding to the closed position (FIG. 4) and the open position (FIG. 2) of the hinge, respectively.

Figure 4:
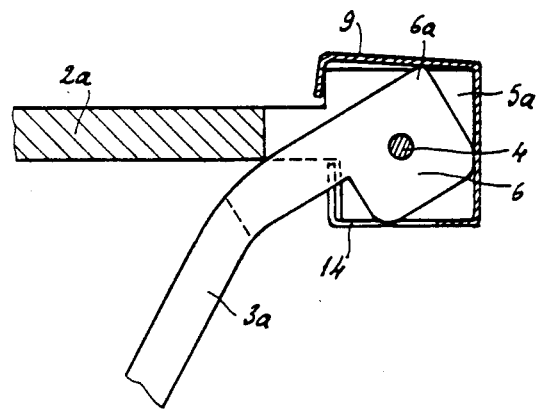
FIGS. 4 and 5 are views similar to FIG. 2, showing this hinge in the closed position and intermediate position between its open and closed positions, respectively.
Figure 5:
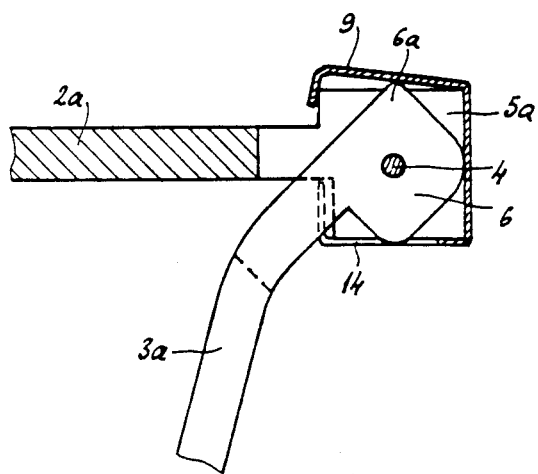

In addition, this boss 6a has its size and angular position determined so that in the closed position of the hinge, as shown in FIG. 4, it receives a light pressure directed radially toward the interior by the internal face of the wall of housing 9 with which it is in contact. In this maximum closed position of the hinge, tenons 8 of element 3 are in contact with leaf 2a of the other element 2 of this hinge. Consequently, boss 6a of each hub 6 creates in the corresponding wall of housing 9 an elastic deformation which tends to keep element 3 constantly in the closed position at the minimum angle. Thus, the initial pivoting of element 3 in the opening direction of the hinge, in other words in the direction of arrow 15, tends to increase the elastic deformation of said wall of housing 9, thereby creating an increase in the resistance to pivoting of this hub until boss 6a reaches point 6'b in its trajectory 6b, after which the elastic force exerted on boss 6a by housing 9 facilitates, by assisting it, the continuation of rotation of element 3 until it reaches the open position of the hinge as shown in FIG. 2.

Of course, if it is desired for elastic retention to also be operative in the open position at the maximum angle of the hinge, one can provide on each hub a second boss or even a single boss with a suitable profile, capable of cooperating with one of the walls of the housing to create this elastic force in the open position at the maximum angle of the hinge.

FIGS. 6 and 7 illustrate a second embodiment of this hinge.

In this embodiment, on both sides of each tenon 7, the external contour of bearings 5a is circular and on either side of longitudinal slot 13, the internal cross section of housing 9 is circular and has the same radius as the external peripheral contour of bearings 5a so as to match them perfectly. In addition, housing 9, preferably in the vicinity of one of the edges of slot 13, has a longitudinal boss 9a and each bearing 5a has, in the same angular position as boss 9a of housing 9, a notch 5'a capable of accommodating the corresponding section of boss 9a.

In addition, each hub 6 has a circular external perimeter of the same radius as that of bearings 5a but having a plurality of notches 6' capable of being engaged, one after the other, at the user's wish, in the corresponding section of boss 9a of housing 9.

Thus, the user can place element 3 of this hinge in the desired angular position selected from one of the various possible positions, of which each is determined by the engagement of a notch 6' of each hub 6 on boss 9a of housing 9. Of course, as will be readily apparent, in order to engage another notch 6' on boss 9a of housing 9, it is sufficient to pivot tenons 8 of hubs 6 against the elastic force created by the engagement of boss 9a of housing 9 in one of notches 6' of said hub 6. The number of angular positions possible for element 3 of this hinge is obviously determined by the number of notches 6' provided on each of its hubs 6.

What is claimed is:

1. A hinge comprising a hinge pin, at least one fork comprising bearings supporting said hinge pin, at least one hub fitted on said hinge pin, said bearings and said hub being accommodated in an elastic housing linked in rotation with said bearings, said housing comprising a wall having a longitudinal slot with at least one edge aligned parallel with said hinge pin, a greatest width of said slot defining a desired opening angle of said hinge.

2. A hinge according to claim 1, further comprising a fork hinge tenon connected to said fork and a hub hinge tenon connected to said hub.

3. A hinge according to claim 2, further comprising a hinge leaf connected to each said tenon.

4. A hinge according to claim 2, wherein said slot is configured to allow said fork hinge tenon and said hub hinge tenon to pass through said slot.

5. A hinge according to claim 2, wherein along at least one edge of said slot and coinciding with each tenon of said hub is at least one notch in said housing orthogonal to an axis of said hinge pin, a bottom of said notch serving as a stop to limit opening of said tenon.

6. A hinge according to claim 5, wherein a tooth is provided between adjacent said notches, and play is provided between each said tooth and a corresponding part of the contour of the bearing facing said tooth.

7. A hinge according to claim 1, wherein an external contour of said bearings is substantially circular and an internal contour of said housing is substantially circular and of substantially the same radius as a radius of said external contour of said bearings.

8. A hinge according to claim 7, wherein said housing further comprises a longitudinal boss and each bearing comprises, in the same angular position as said boss, a notch capable of receiving corresponding sections of said boss, said hub has a substantially circular exterior perimeter with substantially the same radius as said bearings, and said hub has a plurality of notches capable of being engaged, one after another, with corresponding sections of said boss.

9. A hinge according to claim 8, wherein said boss is adjacent one edge of said slot.

10. A hinge according to claim 1, wherein an external contour of said bearings is polygonal and an internal contour of said housing is substantially the same as said external contour of said bearings, an external contour of said hub has at least one boss whose circular trajectory is not inscribed entirely in said internal contour of said housing, and each said boss is positioned angularly so that a point of said trajectory which projects furthest outside said housing is located between two adjacent stable angular positions.

11. A hinge according to claim 10, wherein said boss and said housing are so configured that, when the hinge is in a closed position, said boss is in contact with a face of said housing.

12. A hinge according to claim 11, wherein said boss is under pressure from said housing at a location of said contact.

13. A hinge according to claim 1, wherein said housing is made of an elastic metal.

14. A hinge according to claim 1, wherein said housing is made of an elastic plastic.

* * * * *